United States Patent [19]

Le-Khac

[11] Patent Number: 5,627,120

[45] Date of Patent: *May 6, 1997

[54] HIGHLY ACTIVE DOUBLE METAL CYANIDE CATALYSTS

[75] Inventor: Bi Le-Khac, West Chester, Pa.

[73] Assignee: ARCO Chemical Technology, L.P., Greenville, Del.

[*] Notice: The term of this patent shall not extend beyond the expiration date of Pat. No. 5,482,908.

[21] Appl. No.: 634,998

[22] Filed: Apr. 19, 1996

[51] Int. Cl.$^6$ .................................................. B01J 31/00
[52] U.S. Cl. .................... 502/156; 502/154; 502/159; 502/175; 502/200
[58] Field of Search .................................. 502/154, 156, 502/159, 175, 200

[56] References Cited

U.S. PATENT DOCUMENTS

| | | | |
|---|---|---|---|
| 3,829,505 | 8/1974 | Herold | 502/175 |
| 4,477,589 | 10/1984 | Hulst et al. | 502/169 |
| 5,158,922 | 10/1992 | Hinney et al. | 502/175 |
| 5,482,908 | 1/1996 | Le-Khac | 502/159 |

*Primary Examiner*—Glenn A. Caldarola
*Assistant Examiner*—Elizabeth D. Wood
*Attorney, Agent, or Firm*—Jonathan L. Schuchardt

[57] ABSTRACT

Highly active double metal cyanide (DMC) catalysts are disclosed. The catalysts comprise a DMC complex, and organic complexing agent, and from about 5 to about 80 wt. %, based on the amount of catalyst, of a polyether having a number average molecular weight less than about 500. The catalysts polymerize propylene oxide at a rate in excess of about 1 kg PO/g Co/min. at 100 ppm catalyst, based on the weight of finished polyether, at 105° C. The catalysts, which are easy to prepare, give polyether polyols with exceptionally low unsaturation levels.

16 Claims, 1 Drawing Sheet

FIG—1
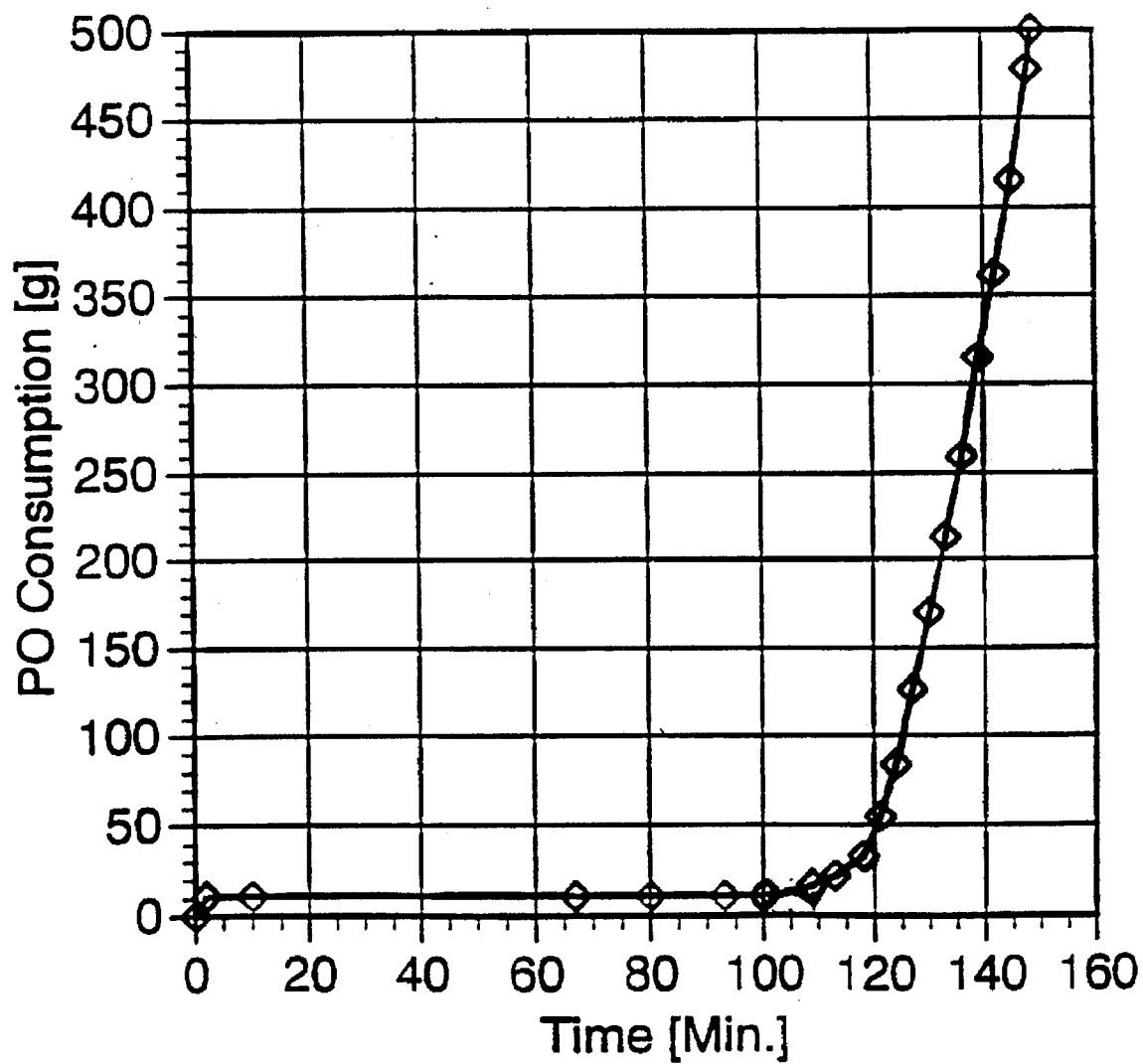

HIGHLY ACTIVE DOUBLE METAL CYANIDE CATALYSTS

FIELD OF THE INVENTION

The invention relates to double metal cyanide (DMC) complex catalysts useful for epoxide polymerization. In particular, the DMC catalysts of the invention, which include a polyether, are easy to prepare and have exceptional activity.

BACKGROUND OF THE INVENTION

Double metal cyanide (DMC) complexes are well-known catalysts for epoxide polymerization. These active catalysts give polyether polyols that have low unsaturation compared with similar polyols made using basic (KOH) catalysis. The catalysts can be used to make many polymer products, including polyether, polyester, and polyetherester polyols. The polyols can be used in polyurethane coatings, elastomers, sealants, foams, and adhesives.

DMC catalysts are usually made by reacting aqueous solutions of metal salts and metal cyanide salts to form a precipitate of the DMC compound. A low molecular weight complexing agent, typically an ether or an alcohol, is included in the catalyst preparation. Other known complexing agents include ketones, esters, amides, ureas, and the like. See, for example, U.S. Pat. Nos. 4,477,589, 3,829,505, and 5,158,922. The traditional favorite complexing agent has been glyme (dimethoxyethane), which gives DMC catalysts having activities within the range of about 0.1 to about 0.5 kg PO/g Co/min. at 100 ppm, based on the weight of finished polyether, at 105° C.

Recently, I discovered (see U.S. Pat. No. 5,482,908, "the '908 patent") that the activity of DMC catalysts is greatly enhanced by incorporating, in addition to the organic complexing agent, from about 5 to about 80 wt. % of a polyether having a number average molecular weight greater than about 500. Catalysts that contain both an organic complexing agent (e.g., tert-butyl alcohol) and a polyether polyol can polymerize propylene oxide at rates in excess of 2 kg PO/g Co/min. at 100 ppm catalyst, based on the weight of finished polyether, at 105° C. In contrast, a catalyst containing polyol but no tert-butyl alcohol was inactive, and a catalyst made with only tert-butyl alcohol was less active. Our initial work suggested that polyethers having molecular weights lower than 500 and polyethylene glycols were generally not suitable or gave much less active catalysts.

The ability to make very active DMC catalysts with low molecular weight polyethers would be valuable because low molecular weight polyethers are often cheaper or more readily available than those having molecular weights greater than 500. Ideally, these DMC catalysts would offer the advantages of the catalysts described in the '908 patent. For example, they would give polyether polyols with very low unsaturation, and would be active enough to allow their use at a very low concentrations, preferably at concentrations low enough to overcome any need to remove the catalysts from the polyol.

SUMMARY OF THE INVENTION

The invention is a solid double metal cyanide (DMC) catalyst useful for epoxide polymerizations. The catalyst comprises a DMC compound, an organic complexing agent, and from about 5 to about 80 wt. %, based on the amount of catalyst, of a polyether having a number average molecular weight less than about 500. The catalyst is highly active: it polymerizes propylene oxide at a rate in excess of about 1 kg PO/g Co/min. at 100 ppm catalyst, based on the weight of finished polyether, at 105° C. Because the catalyst is so active, it can be used at very low concentrations, effectively eliminating the need for a catalyst removal step. In addition, the catalyst gives polyether polyols with exceptionally low unsaturation levels. The invention includes methods for making the catalyst.

BRIEF DESCRIPTION OF THE DRAWING

FIG. 1 shows a plot of propylene oxide consumption versus time during a polymerization reaction with one of the catalysts of the invention at 50 ppm catalyst. The activity of the catalyst (usually reported in this application as kilograms of propylene oxide converted per gram of cobalt per minute) is determined from the slope of the curve at its steepest point.

DETAILED DESCRIPTION OF THE INVENTION

Double metal cyanide (DMC) compounds useful in the invention are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetonate, zinc benzoate, zinc nitrate, iron(II) sulfate, iron(II) bromide, cobalt(II) chloride, cobalt(II) thiocyanate, nickel(II) formate, nickel(II) nitrate, and the like, and mixtures thereof.

The water-soluble metal cyanide salts used to make the double metal cyanide compounds preferably have the general formula $(Y)_a M'(CN)_b (A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion. A is an ion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanocobaltate(III), and the like.

Examples of double metal cyanide compounds that can be used in the invention include, for example, zinc hexacyanocobaltate(III), zinc hexacyanoferrate(III), nickel hexacyanoferrate(II), cobalt hexacyanocobaltate(III), and the like. Further examples of suitable double metal cyanide complexes are listed in U.S. Patent No. 5,158,922, the teachings of which are incorporated herein by reference. Zinc hexacyanocobaltate(III) is preferred.

The solid DMC catalysts of the invention include an organic complexing agent. Generally, the complexing agent must be relatively soluble in water. Suitable complexing agents are those commonly known in the art, as taught, for example, in U.S. Patent No. 5,158,922. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, secbutyl alcohol, and tert-butyl alcohol. Tert-butyl alcohol is particularly preferred.

The solid DMC catalysts of the invention include from about 5 to about 80 wt. %, based on amount of catalyst, of a polyether having a number average molecular weight less than about 500. Preferred catalysts include from about 10 to about 70 wt. % of the polyether; most preferred catalysts include from about 15 to about 60 wt. % of the polyether. At least about 5 wt. % of the polyether is needed to significantly improve the catalyst activity compared with a catalyst made in the absence of the polyether. Catalysts that contain more than about 80 wt. % of the polyether generally are no more active, and they are impractical to isolate and use because they are typically sticky pastes rather than powdery solids.

Polyethers suitable for use in making the catalysts of the invention have number average molecular weights (Mn) less than about 500. Suitable polyethers include those produced by ring-opening polymerization of cyclic ethers, and include low-molecular-weight epoxide polymers, oxetane polymers, tetrahydrofuran polymers, and the like. Any method of catalysis can be used to make the polyethers. The polyethers can have any desired end groups, including, for example, hydroxyl, amine, ester, ether, or the like.

Preferred polyethers are polyether polyols having average hydroxyl functionalities from about 1 to about 8 and number average molecular weights within the range of about 150 to about 500, more preferably from about 200 to about 400. These can be made by polymerizing epoxides in the presence of active hydrogen-containing initiators and basic, acidic, or organometallic catalysts (including DMC cattalysts). Useful polyether polyols include poly(propylene glycol)s, poly(ethylene glycol)s, EO-capped poly (oxypropylene) polyols, mixed EO-PO polyols, butylene oxide polymers, butylene oxide copolymers with ethylene oxide and/or propylene oxide, polytetramethylene ether glycols, and the like. Suitable polyethers also include, for example, tripropylene glycol, triethylene glycol, tetrapropylene glycol, tetraethylene glycol, dipropylene glycol monomethyl ether, tripropylene glycol monomethyl ether, monoalkyl and dialkyl ethers of glycols and poly(alkylene glycol)s, and the like. Most preferred are poly(propylene glycol)s and poly(ethylene glycol)s having number average molecular weights within the range of about 150 to about 500.

I found that both an organic complexing agent and a polyether are needed in the double metal cyanide catalyst. Including the polyether in addition to the organic complexing agent surprisingly enhances catalyst activity compared with the activity of a similar catalyst prepared in the absence of the polyether (see Examples 1–5 and Comparative Example 9). The organic complexing agent is also needed: a catalyst made in the presence of the polyether, but without an organic complexing agent such as tert-butyl alcohol, will not ordinarily polymerize epoxides (see Comparative Examples 6–8).

The catalysts of the invention are characterized by any suitable means. The polyether and organic complexing agent are conveniently identified and quantified, for example, using thermogravimetric and mass spectral analyses. Metals are easily quantified by elemental analysis.

The catalysts of the invention can also be characterized using powder X-ray diffraction. The catalysts exhibit broad lines centered at characteristic d-spacings. For example, a zinc hexacyanocobaltate catalyst made using tert-butyl alcohol and a poly(ethylene glycol) of about 300 molecular weight has two broad signals centered at d-spacings of about 5.75 and 4.82 angstroms, and a somewhat narrower signal centered at a d-spacing of about 3.76 angstroms. (See Table 2). This diffraction pattern is further characterized by the absence of sharp lines corresponding to highly crystalline zinc hexacyanocobaltate at d-spacings of about 5.07, 3.59, 2.54, and 2.28 angsttoms.

The invention includes a method for preparing solid DMC catalysts useful for epoxide polymerization. The method comprises preparing a DMC catalyst in the presence of a polyether having a number average molecular weight less than about 500, wherein the solid DMC catalyst contains from about 5 to about 80 wt. % of the polyether.

Generally, the method is performed by reacting, in an aqueous solution, a metal salt (excess) and a metal cyanide salt in the presence of the polyether and an organic complexing agent. Enough of the polyether is used to give a solid DMC catalyst that contains from about 5 to about 80 wt. % of the polyether. Catalysts made using the method of the invention have enhanced activity for epoxide polymerization compared with similar catalysts prepared in the absence of the polyether.

In one method of the invention (illustrated by Examples 1–5 below), aqueous solutions of a metal salt (such as zinc chloride) and a metal cyanide salt (such as potassium hexacyanocobaltate) are first reacted in the presence of an organic compiexing agent (such as tert-butyl alcohol) using efficient mixing to produce a catalyst slurry. The metal salt is used in excess. The catalyst slurry contains the reaction product of the metal salt and metal cyanide salt, which is the double metal cyanide compound. Also present are excess metal salt, water, and organic complexing agent; each is incorporated to some extent in the catalyst structure.

The organic complexing agent can be included with either or both of the aqueous salt solutions, or it can be added to the catalyst slurry immediately following precipitation of the DMC compound. It is generally preferred to premix the complexing agent with either aqueous solution, or both, before combining the reactants.

The aqueous metal salt and metal cyanide salt solutions (or their DMC reaction product) need to be mixed efficiently with the complexing agent to produce the most active form of the catalyst. A homogenizer or high-shear stirrer is conveniently used to achieve efficient mixing.

The catalyst slurry produced in the first step is then combined with a polyether having a number average molecular weight less than about 500. This second step may be performed using low-shear mixing if desirable to minimize foaming. When very efficient mixing is used in this step, the mixture can thicken or coagulate, which complicates isolation of the catalyst. In addition, the catalyst may lack the desired enhanced activity.

Third, a polyether-containing solid catalyst is isolated from the catalyst slurry. This is accomplished by any convenient means, such as filtration, centrifugation, or the like.

The isolated polyether-containing solid catalyst is then washed with an aqueous solution that contains additional organic complexing agent. Washing is generally accomplished by reslurrying the catalyst in the aqueous solution of organic complexing agent, followed by a catalyst isolation step. This washing step is used to remove impurities from the catalyst, for example KCl, that will render the catalyst inactive if they are not removed. Preferably, the amount of organic complexing agent used in this aqueous solution is within the range of about 40 wt. % to about 70 wt. %. It is also preferred to include some polyether in the aqueous solution of organic complexing agent. The amount of polyether in the wash solution is preferably within the range of about 0.1 wt. % to about 8 wt. %. Including a polyether in the wash step generally enhances catalyst activity.

While a single washing step suffices to give a catalyst with enhanced activity, it is preferred to wash the catalyst more than once. The subsequent wash can be a repeat of the first wash. Preferably, the subsequent wash is non-aqueous, i.e., it includes only the organic complexing agent or a mixture of the organic complexing agent and polyether.

After the catalyst has been washed, it is usually preferred to dry it under vacuum (26 in. Hg to about 30 in. Hg) until the catalyst reaches a constant weight. The catalyst can be dried at temperatures within the range of about 40° C. to about 90° C.

In a second method of the invention, impurities are removed from the catalyst during preparation by a dilution method that eliminates the need to wash the isolated polyether-containing catalyst with an aqueous solution of complexing agent.

First, aqueous solutions of a metal salt (excess) and a metal cyanide salt are reacted in the presence of an organic complexing agent using efficient mixing (as described above) to produce a catalyst slurry. Second, the catalyst slurry is mixed efficiently with a diluent which comprises an aqueous solution of additional organic complexing agent. The diluent is used in an amount effective to solubilize impurities (i.e., excess reactants, KCl, etc.) in the aqueous phase.

After dilution with aqueous complexing agent, the catalyst slurry is combined with a polyether having a number average molecular weight less than about 500. It is generally preferred to use low-shear mixing in this step. The polyether-containing solid catalyst is then isolated from the slurry by any convenient means (as described earlier), including filtration, centrifugation, or the like. After isolation, the catalyst is preferably washed with additional organic complexing agent or a mixture of additional polyether and organic complexing agent. This washing step can be accomplished without the need to reslurry or resuspend the solids in the wash solvent. Finally, a solid DMC catalyst that contains from about 5 to about 80 wt. % of the polyether is isolated.

The catalysts of the invention have significantly higher activity than most DMC catalysts previously known in the art. For example, conventional DMC catalysts made with glyme complexing agent and no polyether (as described, for example, in U.S. Pat. Nos. 4,477,589, 3,829,505, and 5,158, 922) have activities within the range of about 0.1 to about 0.5 kg PO/g Co/min. at 100 ppm, based on the weight of finished polyether, at 105° C. In contrast, the catalysts of the invention polymerize propylene oxide at a rate in excess of 1 kg PO/g Co/min. at 100 ppm, based on the weight of finished polyether, at 105° C. These catalysts have enhanced activity similar to the catalysts I previously disclosed in U.S. Pat. No. 5,482,908, which use polyethers of higher molecular weight. While it was previously thought that lower molecular weight polyethers would not be suitable for use, I have now found that polyethers having molecular weights less than 500 can, in fact, be used to produce polyether-containing DMC catalysts with high activity. As Examples 1–5 and Comparative Example 9 demonstrate, the catalysts of the invention have activities greater than that of a zinc hexacyanocobaltate/tert-butyl alcohol complex made in the absence of a polyether.

The catalysts of the invention are active enough to allow their use at very low catalyst concentrations, such as 25 ppm or less (see Example 10 below). At such low catalyst levels, the catalyst can often be left in the polyether polyol product without an adverse impact on product quality. For example, the amount of residual Zn and Co in the polyol from a zinc hexacyanocobaltate catalyst of the invention can be within product specifications (<5 ppm each) before any purification of the polyol. When higher product purity is needed, a simple filtration is usually adequate to remove the last traces of catalyst from the polyol product; the catalyst appears to be heterogeneous. The ability to leave these catalysts in the polyol is an important advantage because at present, most commercial polyether polyols (generally made with KOH) require a catalyst removal step.

The following examples merely illustrate the invention. Those skilled in the art will recognize many variations that are within the spirit of the invention and scope of the claims.

EXAMPLE 1

Preparation of a Polyether-Containing DMC Catalyst (PEG-300)

Potassium hexacyanocobaltate (7.5 g) is dissolved in distilled water (300 mL) and tert-butyl alcohol (50 mL) in a beaker (Solution 1). Zinc chloride (76 g) is dissolved in distilled water (76 mL) in a second beaker (Solution 2). A third beaker contains Solution 3: a mixture of distilled water (200 mL), tert-butyl alcohol (2 mL), and polyol (8 g of PEG-300, a 300 mol. wt. poly(ethylene glycol) obtained from Aldrich).

Solution 2 is added to solution 1 over 30 min. at 30° C. with mixing using a homogenizer set at 20% intensity. Mixing intensity is increased to 40% for 10 min. The homogenizer is removed. Solution 3 is added, and the mixture is stirred for 3 min. using a magnetic stirring bar. The mixture is filtered under pressure (40 psig) through a 20-micron filter.

The catalyst solids are reslurried in tert-butyl alcohol (130 mL) and distilled water (56 mL) and homogenized at 40% intensity for 10 min. The homogenizer is removed. PEG-300 (2 g) is added and mixed using magnetic stirring for 3 min. The mixture is filtered under pressure as described above. The catalyst solids are reslurred in tert-butyl alcohol (185 mL) and homogenized as before. PEG-300 (1 g) is added and mixed using magnetic stirring for 3 min. The mixture is filtered under pressure. The resulting catalyst cake is dried at 60° C. under vacuum (30 in. Hg) to a constant weight.

EXAMPLE 2

Preparation of a Polyether-Containing DMC Catalyst (PEG-300)

Zinc chloride (75 g) is dissolved in distilled water (275 mL) and tert-butyl alcohol (50 mL) to make Solution 1. Potassium hexacyanocobaltate (7.5 g) is dissolved in distilled water (100 mL) in a second beaker (Solution 2). A third beaker contains Solution 3: a mixture of distilled water (50 mL), tert-butyl alcohol (2 mL), and polyol (8 g of PEG-300).

Solution 2 is added to solution 1 over 30 min. at 50° C. with mixing using a homogenizer set at 20% intensity. Mixing intensity is increased to 40% for 10 min. The homogenizer is removed. Solution 3 is added, and the mixture is stirred for 3 min. using a magnetic stirring bar. The mixture is filtered under pressure (40 psig) through a 5-micron filter.

The catalyst solids are reslurried in tertbutyl alcohol (130 mL) and distilled water (55 mL) and homogenized at 40% intensity for 10 min. The homogenizer is removed. PEG-300 (2 g) is added and mixed using magnetic stirring for 3 min. The mixture is filtered under pressure as described above. The catalyst solids are reslurred in tert-butyl alcohol (185 mL) and homogenized as before. PEG-300 (1 g) is added and mixed using magnetic stirring for 3 min. The mixture is filtered under pressure. The resulting catalyst cake is dried at 60° C. under vacuum (30 in. Hg) to a constant weight.

EXAMPLE 3

Preparation of a Polyether-Containing DMC Catalyst (PPG-425)

The procedure of Example 1 is followed, except that PPG-425, a 400 mol. wt. poly(propylene glycol) prepared by KOH catalysis, is used instead of PEG-300, and the catalyst is prepared at 50° C. instead of 30° C. The resulting catalyst is isolated and dried as described previously.

EXAMPLE 4

Preparation of a Polyether-Containing DMC Catalyst (PPG-425)

A solution (Solution 1) of zinc chloride (252 g), distilled water (924 mL), and tert-butyl alcohol (168 mL) is prepared in a one-gallon glass reactor. Potassium hexacyanocobaltate (25.2 g) is dissolved in distilled water (336 mL) in a beaker (Solution 2). Another beaker contains Solution 3: a mixture of distilled water (160 mL), tert-butyl alcohol (6.7 mL), and polyol (26.9 g of PPG-425).

Solution 2 is added to solution 1 over 1 h at 50° C. with 450 rpm stirring. After the addition is complete, the stirring rate is increased to 900 rpm for 1 h under 10 psig nitrogen. The stirring rate is decreased to 200 rpm. Solution 3 is added, and the mixture is stirred for 3 min. at 200 rpm. The mixture is filtered under pressure (40 psig) through a 10-micron filter.

The catalyst solids are reslurried in the same reactor with tert-butyl alcohol (437 mL) and distilled water (186 mL) and mixed at 900 rpm for 1 h. The stirring rate is decreased to 200 rpm. PPG-425 (6.7 g) is added, and the mixture is stirred at 200 rpm for 3 min. The mixture is filtered under pressure as described above. The catalyst solids are reslurred in tert-butyl alcohol (622 mL) and stirred as described above. The stirring rate is again decreased to 200 rpm. PPG-425 (3.4 g) is added and mixed for 3 min. The mixture is filtered under pressure. The resulting catalyst cake is dried at 60° C. under vacuum (30 in. Hg) to a constant weight.

EXAMPLE 5

Preparation of a Polyether-Containing DMC Catalyst

(Tripropylene Glycol Monomethyl Ether)

The procedure of Example 2 is followed, except that tripropylene glycol monomethyl ether (Aldrich) is used instead of PEG-300. The resulting catalyst is isolated and dried as described previously.

COMPARATIVE EXAMPLE 6

Preparation of a Polyether-Containing DMC Catalyst: PEG-300 Polyol; No tert-Butyl Alcohol Complexing Agent (30° C.)

Potassium hexacyanocobaltate (7.5 g) and PEG-300 (8.0 g) are dissolved in distilled water (300 mL) in a beaker (Solution 1). Zinc chloride (76 g) is dissolved in distilled water (76 mL) in a second beaker (Solution 2).

Solution 2 is added to solution 1 over 30 min. at 30° C. with mixing using a homogenizer set at 20% intensity. Mixing intensity is increased to 40% for 10 min. The mixture is filtered under pressure (40 psig) through a 5-micron filter.

The catalyst solids are reslurried in distilled water (200 mL) and homogenized at 40% intensity for 10 min. The mixture is filtered under pressure as described above. The resulting catalyst cake is dried at 60° C. under vacuum (30 in. Hg) to a constant weight.

COMPARATIVE EXAMPLE 7

Preparation of a Polyether-Containing DMC Catalyst: PPG-425 Polyol; No tert-Butyl Alcohol Complexing Agent The procedure of Comparative Example 6 is followed, except that PPG-425 polyol is used in place of PEG-300 polyol. The resulting catalyst is isolated and dried as described previously.

COMPARATIVE EXAMPLE 8

Preparation of a Polyether-Containing DMC Catalyst: PEG-300 Polyol; No tert-Butyl Alcohol Complexing Agent (50° C.)

Zinc chloride (75 g) and PEG-300 (39 g) are dissolved in distilled water (275 mL) in a beaker (Solution 1). Potassium hexacyanocobaltate (7.5 g) is dissolved in distilled water (100 mL) in a beaker (Solution 2). PEG-300 (8 g) is dissolved in distilled water (50 mL) in a beaker (Solution 3).

Solution 2 is added to solution 1 over 30 min. at 50° C. with mixing using a homogenizer set at 20% intensity. Mixing intensity is increased to 40% for 10 min. The homogenizer is removed. Solution 3 is added, and the mixture is stirred with a magnetic stirrer for 3 min. The mixture is filtered under pressure (40 psig) through a 5-micron filter. The catalyst solids are reslurried in distilled water (75 mL) and PEG-300 (75 g), and the mixture is homogenized at 40% intensity for 10 min. The homogenizer is removed. PEG-300 (2 g) is added, and the mixture is stirred magnetically for 3 min. The mixture is filtered under pressure as described above. The resulting catalyst cake is dried at 60° C. under vacuum (30 in. Hg) to a constant weight.

COMPARATIVE EXAMPLE 9

Preparation of a DMC Catalyst With Tert-Butyl Alcohol (Complexing Agent) and Without a Polyether Polyol Potassium hexacyanocobaltate (24 g) is dissolved in distilled water (450 mL) in a beaker (Solution 1). Zinc chloride (60 g) is dissolved in distilled water (90 mL) in a second beaker (Solution 2). Solutions 1 and 2 are combined using a homogenizer for mixing. Immediately thereafter, a mixture of tert-butyl alcohol and water (50/50 by volume, 600 mL) is slowly added, and the resulting slurry is homogenized for 10 min. The slurry is centrifuged, and the liquid portion is decanted. The solids are reslurried in a mixture of tert-butyl alcohol and water (70/30 by volume, 600 mL), and this mixture is homogenized for 10 min., and then centrifuged and decanted as described above to isolate the washed solids. The solids are reslurried in 100% tert-butyl alcohol (600 mL), and the mixture is homogenized for 10 min., centrifuged, and decanted. The solid catalyst is dried in a vacuum oven (50° C., 30 in. Hg) to constant weight.

Elemental, thermogravimetric, and mass spectral analyses of the solid catalyst show: tert-butyl alcohol=14.1 wt. %; cobalt=12.5 wt. %; (polyol=0 wt. %).

EXAMPLE A

Measurement of Catalyst Activity and Polyether Polyol Synthesis

Catalysts prepared as described above are used to prepare polyether triols having hydroxyl numbers of about 30 mg KOH/g as follows.

A one-liter stirred reactor is charged with 70 g of a 700 mol. wt. poly(oxypropylene) triol starter polyol and 0.014 g to 0.057 g of the zinc hexacyanocobaltate/tert-butyl alcohol/polyether polyol catalyst (25 to 100 ppm of catalyst in the final polyol product, see Table 1 footnotes). The mixture is vigorously stirred and heated to 105° C. under vacuum for about 30 min. to remove traces of residual water. Propylene oxide (PO) (about 10 to 11 g) is added to the reactor, and the pressure in the reactor is increased from vacuum to about 4 psig. An accelerated drop in reactor pressure soon occurs, indicating that the catalyst has become activated. After initiation of the catalyst is verified, additional propylene oxide (a total of 500 g) is added slowly to the reactor to maintain the reactor pressure at about 10 psig.

Catalyst activity is measured from the slope of a PO conversion vs. time plot at its steepest point (see FIG. 1 for a sample plot, and Table 1 for polymerization rates). After the PO addition is complete, the reaction mixture is held at 105° C. until a constant pressure is obtained, which indicates that PO conversion is complete. The mixture is vacuum stripped at 60° to 80° C. for 0.5 h to remove any traces of unreacted PO from the reactor. The product is cooled and recovered. The product is a poly(oxypropylene) triol having a hydroxyl number of about 30 mg KOH/g (see Table 1).

EXAMPLE B

Catalyst Characterization by Powder X-ray Diffraction

Table 2 shows typical powder X-ray diffraction results for a number of zinc hexacyanocobaltate catalysts. The X-ray patterns for Comparative Examples 6–9 (catalysts made in the presence of a polyol, but no tert-butyl alcohol complexing agent) resemble the pattern for highly crystalline zinc hexacyanocobaltate hydrate, which is made in the absence of any polyol or organic complexing agent. All of these "catalysts" are inactive toward epoxide polymerization.

Catalysts of the invention (Examples 1–5), which are made in the presence of both tert-butyl alcohol and a polyol, exhibit a broad signal at a d-spacing of about 5.75 angstroms. This signal is absent from the catalyst made with tert-butyl alcohol but no polyol (Comparative Example 9). While the catalysts of Examples 1–5 and C9 actively polymerize propylene oxide, the catalysts made with both tert-butyl alcohol and polyol (Examples 1–5) have higher activities (see Table 1).

EXAMPLE 10

Preparation of a 8K Poly(oxypropylene) Diol Using 25 ppm Catalyst

This example shows that catalysts of the invention are active enough to enable the preparation of polyether polyols using low catalyst concentrations. This effectively eliminates the need for catalyst removal for many polyol end uses.

A sample of the catalyst prepared in Example 4 is used. A one-liter stirred reactor is charged with catalyst (0.0166 g, 25 ppm in the finished polyol) and a 785 mol. wt. poly (oxypropylene) diol (65 g) prepared conventionally from propylene glycol, KOH, and propylene oxide. The mixture is well stirred and heated to 105° C. under vacuum for about 30 min. to remove traces of residual water. The mass temperature is increased to 130° C. Propylene oxide (11 g) is added to the reactor, and the pressure in the reactor is increased from vacuum to about 2 psig. An accelerated pressure drop occurs, indicating that the catalyst has become active. After catalyst initiation is verified, additional propylene oxide (600 g total) is continuously added at 1.7 g/min. over 6 h. The reactor is held at 130° C. for 30 to 45 min. until a constant pressure is obtained, which indicates that propylene oxide conversion is complete. The mixture is stripped under vacuum at 60° C. for 30 min. to remove traces of unreacted propylene oxide. The product is cooled and recovered. The resulting 8000 mol. wt. poly(PO) diol) has a hydroxyl number of 14.9 mg KOH/g, an unsaturation of 0.0055 meq/g, and a Mw/Mn=1.22.

The preceding examples are meant only as illustrations. The following claims define the scope of the invention.

TABLE 1

Catalyst Compositions & Activities, and Properties of Polyether Triols made from the Catalysts: Zinc Hexacyanocobaltate/t-Butyl alcohol/Polyether polyol as a Catalyst

| | Catalyst | | | | Catalyst | 6K mw Poly(PO) Triol Product* | | |
|---|---|---|---|---|---|---|---|---|
| Ex. # | Complex Agent | Polyol | Amt. (wt. %) | Temp (°C.) | Activity (kg PO/g Co/min) | OH# (mg KOH/g) | Unsat. (meq/g) | Mw/Mn |
| 1 | TBA | PEG-300 | 19 | 30 | 3.0 | 29.3 | 0.0065 | 1.36 |
| 2 | TBA | PEG-300 | 21 | 50 | 5.0 | 29.8 | 0.0040 | 1.28 |
| 3 | TBA | PPG-425 | — | 50 | 5.4 | 30.0 | 0.0041 | 1.27 |
| 4 | TBA | PPG-425 | 21 | 50 | 11 | 29.2 | 0.0036 | 1.22 |
| 5 | TBA | TPGME | 22 | 50 | 15 | 29.4 | 0.0041 | 1.20 |
| C6 | none | PEG-300 | 51 | 30 | 0 | — | — | — |
| C7 | none | PPG-425 | 28 | 30 | 0 | — | — | — |
| C8 | none | PEG-300 | — | 50 | 0 | — | — | — |
| C9 | TBA | none | — | 30 | 1.8 | 29.8 | 0.0052 | — |

PEG-300 = poly(ethylene glycol) of mol. wt. 300 from Aldrich; PPG-425 = poly(propylene glycol) of mol. wt. 400 made by KOH catalysis; TPGME = tripropylene glycol monomethyl ether.
Amount of catalyst used in the rate experiments: Exs. 1 and 2 use 100 ppm; Ex. 3 uses 50 ppm; Exs. 4 and 5 use 25 ppm, all amounts based on amount of polyol produced.
Catalyst activities are normalized values based on the amount of cobalt present in the catalyst.

TABLE 2

DMC Catalyst Characterization by X-Ray Diffraction

| Ex # | Catalyst content | X-Ray Diffraction Pattern (d-spacings, angstroms)[1] | | | | | | |
|---|---|---|---|---|---|---|---|---|
| | | 5.75 (br) | 5.07 (s) | 4.82 (br) | 3.76 | 3.59 (s) | 2.54 (s) | 2.28 (s) |
| — | Cryst. Zn—Co[2] | absent | X | absent | absent | X | X | X |
| C6 | Polyol, but no TBA[2] | absent | X | absent | absent | X | X | X |
| C9 | TBA, but no polyol[2] | weak | absent | X | X | absent | absent | absent |
| 1 | TBA & polyol[3] | X | absent | X | X | absent | absent | absent |

X = X-ray diffraction line present; (br) = broad band; (s) = sharp line; weak = weak signal present
Samples were analyzed by X-ray diffraction using monochromatized CuKα₁ radiation (λ = 1.54059 Å). A Seimens D500 Kristalloflex diffractometer powered at 40 kV and 30 mA was operated in a step scan mode of 0.02° 2θ with a counting time of 2 seconds/step. Divergence slits of 1° in conjunction with monochrometer and detector apertures of 0.05° and 0.15° respectively. Each sample was run from 5° to 70° 2θ.
[1]Water of hydration can cause minor variations in measured d-spacings.
[2]Comparative example.
[3]Catalyst of the invention.

I claim:

1. A solid double metal cyanide (DMC) catalyst useful for epoxide polymerization, said catalyst comprising:
   (a) a double metal cyanide compound;
   (b) an organic complexing agent; and
   (c) from about 5 to about 80 wt. %, based on the amount of catalyst, of a polyether having a number average molecular weight less than about 500.

2. The catalyst of claim 1 wherein the double metal cyanide compound is a zinc hexacyanocobaltate.

3. The catalyst of claim 1 wherein the organic complexing agent is tert-butyl alcohol.

4. The catalyst of claim 1 wherein the polyether is a polyether polyol having a number average molecular weight within the range of about 150 to less than about 500.

5. A solid double metal cyanide (DMC) catalyst useful for epoxide polymerization, said catalyst comprising:
   (a) a zinc hexacyanocobaltate compound;
   (b) tert-butyl alcohol; and
   (c) from about 10 to about 70 wt. %, based on the amount of catalyst, of a polyether polyol having a number average molecular weight within the range of about 150 to about 500;
   wherein the catalyst can polymerize propylene oxide at a rate in excess of 2 kg PO/g Co/min. at 100 ppm catalyst, based on the weight of finished polyether, at 105° C.

6. The catalyst of claim 5 wherein the polyether polyol is a poly(propylene glycol) or poly(ethylene glycol) having a number average molecular weight within the range of about 250 to about 400.

7. The catalyst of claim 5 having an X-ray diffraction pattern of (d-spacing, angstroms): 5.75 (br), 4.82 (br), 3.76, and showing no detectable signals corresponding to highly crystalline zinc hexacyanocobaltate at about (d-spacing, angstroms): 5.07, 3.59, 2.54, 2.28.

8. A method which comprises preparing a solid double metal cyanide (DMC) catalyst in the presence of an organic complexing agent and a polyether having a number average molecular weight less than about 500, wherein the solid DMC catalyst contains from about 5 to about 80 wt. % of the polyether.

9. The method of claim 8 wherein the polyether is a polyether polyol having a number average molecular weight within the range of about 150 to less than about 500.

10. The method of claim 8 wherein the DMC catalyst is a zinc hexacyanocobaltate.

11. The method of claim 8 wherein the organic complexing agent is tert-butyl alcohol.

12. A method of preparing a solid double metal cyanide (DMC) catalyst useful for epoxide polymerization, said method comprising:
   (a) reacting aqueous solutions of a metal salt and a metal cyanide salt, said metal salt being used in excess compared with the amount of metal cyanide salt used, in the presence of an organic complexing agent using efficient mixing to produce a catalyst slurry;
   (b) combining the catalyst slurry with a polyether having a number average molecular weight less than about 500;
   (c) isolating a polyether-containing solid catalyst from the slurry;

(d) washing the polyether-containing solid catalyst with an aqueous solution that contains additional organic complexing agent; and (e) recovering a solid DMC catalyst that contains from about 5 to about 80 wt. %, based on the amount of solid DMC catalyst, of the polyether.

13. The method of claim 12 wherein the DMC catalyst is a zinc hexacyanocobaltate.

14. The method of claim 12 wherein the organic complexing agent is tert-butyl alcohol.

15. The method of claim 12 wherein the polyether is a polyether polyol having a number average molecular weight within the range of about 15 to less than about 500.

16. A method of preparing a solid double metal cyanide (DMC) catalyst useful for epoxide polymerization, said method comprising:

(a) reacting aqueous solutions of a metal salt and a metal cyanide salt, said metal salt being used in excess compared with the amount of metal cyanide salt used, in the presence of an organic complexing agent using efficient mixing to produce a catalyst slurry;

(b) efficiently mixing the catalyst slurry with a diluent which comprises an aqueous solution of additional organic complexing agent;

(c) combining the catalyst slurry from step (b) with a polyether having a number average molecular weight less than about 500;

(d) isolating a polyether-containing catalyst from the slurry; and (e) recovering a solid DMC catalyst that contains from about 5 to about 80 wt. %, based on the amount of solid DMC catalyst, of the polyether.

\* \* \* \* \*